July 25, 1967  W. D. CHAMBERS  3,332,523
TELESCOPIC FRICTIONAL SHOCK ABSORBER
Filed May 18, 1966
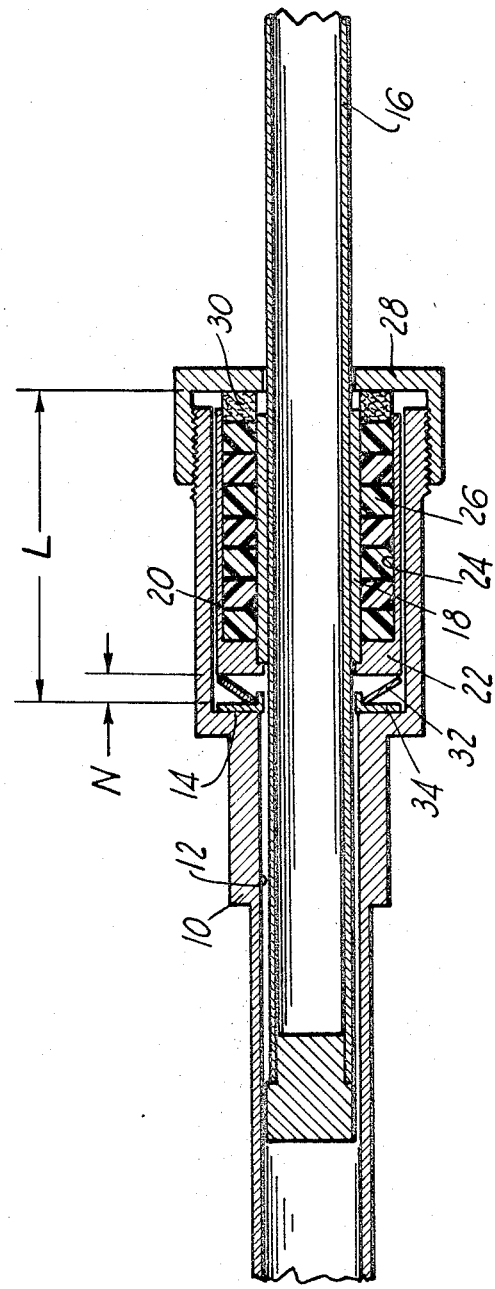
INVENTOR.
WARREN D. CHAMBERS
BY
William N. Antonis
ATTORNEY 3,332,523
TELESCOPIC FRICTIONAL SHOCK
ABSORBER
Warren D. Chambers, South Bend, Ind., assignor to The
Bendix Corporation, a corporation of Delaware
Filed May 18, 1966, Ser. No. 551,124
9 Claims. (Cl. 188—129)

This invention relates to shock absorbers and more particularly to a telescopic frictional shock absorber.

Various known friction type shock absorbers which have been tested have been found to be velocity sensitive. Tests on some shock absorbers have indicated an increase in stroking load of 400 to 600 percent with an increase in velocity from 0.1 f.p.s. to 10 f.p.s. The reason for such velocity sensitivity is not clear, but it is believed that one of the reasons may be that the molecular mechanism by which friction is produced changes with velocity. Another possible reason is that such friction devices are self-energizing.

Accordingly, it is an object of this invention to provide a telescopic frictional shock absorber which has less velocity sensitivity than known telescopic frictional shock absorbers.

Another object of this invention is to provided a telescopic frictional shock absorber which includes mechanism for reducing the rate of increase in stroking loads for shock absorbers of this type.

More specifically, it is an object of this invention to provide a telescopic frictional shock absorber which produces adjustable compressive stroke loads independent of velocity.

The above and other objects, features, and advantages of this invention will become apparent from the following description taken in connection with the accompanying drawing which forms a part of this disclosure.

Referring to the drawing, which shows a sectional view of a shock absorber incorporating the invention, it will be seen that numeral 10 designates a housing having a stepped diameter bore 12 with a shoulder 14 therein. An inner cylinder 16 is located within the bore and is movable relative to the housing. The inner cylinder 16 is suitably connected to a sprung mass whereas the housing 10 is suitably connected to an unsprung mass. A sleeve 18 formed of Teflon or some other suitable friction material which, if desired, exhibits high static to dynamic friction ratio characteristics is located in the bore 12 and frictionally engages inner cylinder 16 in order to resist relative axial movement between the cylinder and the housing. In order to reduce the rate of increase in stroking, a mechanism is utilized which includes a closed end tubular retainer 20 having the closed end 22 in abutment with the sleeve 18. A cavity 24, which is formed between the sleeve and the tubular portion of the retainer, contains suitable force transmitting means therein for exerting a radial force against the sleeve 18 to provide the desired frictional engagement between the sleeve and the inner cylinder 16. Although in the drawing the force transmitting means is shown as being comprised of a plurality of elastomeric O-rings 26 having a rectangular cross section, O-rings having a circular cross section, or a combination of the two types of O-rings, could be utilized to achieve the desired force transmitting characteristics. A nut 28 threadedly engages the housing 10 and in conjunction with packing ring 30 confines the O-rings within the cavity. A Belleville washer 32 is located between the closed end 22 of the tubular retainer 20 and the shoulder 14 and is centered by a shouldered washer 34.

Operation of the device will be as follows: Upon the exertion of a compressive load on inner cylinder 16, the cylinder is caused to slide through sleeve 18 which is surrounded by O-rings 26. When nut 28 is tightened on housing 10, the O-rings, which are confined within cavity 24, are pressed by packing ring 30 and are caused to exert a predetermined radial force against the sleeve 18. At the same time, Belleville washer 32 is subjected to the axial load in the O-rings and is partially deflected. Shouldered washer 34, which serves to center the Belleville washer, provides a hard wear resistance surface against which the Belleville washer can operate. As nut 28 is tightened, length L decreases because of compression of the O-rings and Belleville washer until the desired pressure between the friction sleeve 18 and the inner cylinder 16 is attained. As the inner cylinder is stroked, the stroking load must pass through the Belleville washer. Because of the previously discussed velocity sensitive phenomena, as the stroking load builds up, the Belleville washer will be caused to deflect thereby decreasing length N. Since length L is fixed and can only be varied by rotating nut 28, the compression on the O-rings will be reduced since the length N decreases and the volume of cavity 24 increases. Because of this increase in volume, the pressure exerted by the O-rings against the friction sleeve 18 is relieved and the build up of stroking load is prevented. If desired, the Belleville washer can be formed of a bimetallic material which will vary the spring rate of the washer as a function of temperature.

The numerous applications and practical advantages which flow from such a device are believed to be obvious from the foregoing description, and other advantages may suggest themselves to those who are familiar with the art to which this invention relates.

Furthermore, although this invention has been described in connection with a specific embodiment, it will be obvious to those skilled in the art that various changes may be made in the form, structure and arrangement of parts without departing from the spirit of the invention. For example, if the cavity 24 is suitably sealed, a liquid could be utilized as the force transmitting means instead of the O-rings. Accordingly, I do not desire to be limited to the specific embodiment disclosed herein primarily for purposes of illustration, but instead, desire protection falling within the scope of the appended claims.

Having thus described the various features of the invention what I claim as new and desire to secure by Letters Patent is:

1. A telescopic frictional shock absorber comprising a housing member having a bore therein, an inner member located in said bore and axially movable relative to said housing member, a sleeve located in said bore and between said members for frictionally engaging said inner member to resist relative axial movement between said members, and means located in said bore and operatively connected to said sleeve for reducing the rate of increase in stroking loads, said means including a closed end tubular retainer surrounding said inner member and having the closed end thereof in abutment with one end of said sleeve and the tubular portion thereof spaced from said sleeve to form a cavity therebetween, force transmitting means located in said cavity for exerting a radial force against said sleeve to provide the desired frictional engagement between said sleeve and said inner member, means operatively connected to said housing member for confining said force transmitting means within said cavity, and resilient means located in said bore and operatively connected to said retainer and said housing member for permitting movement of said sleeve and retaining member to increase the volume of said cavity and thereby reduce the radial force exerted by said force transmitting means as the stroking load increases above a predetermined value.

2. A telescopic frictional shock absorber, as defined in claim 1, wherein said force transmitting means comprises a plurality of O-rings formed of an elastomeric material.

3. A telescopic frictional shock absorber, as defined in claim 2, wherein said O-rings have a rectangular cross section.

4. A telescopic frictional shock absorber, as defined in claim 2, wherein the means operatively connected to said housing member for confining the force transmitting means comprises a nut threadedly engaging said housing member and in abutment with said O-rings for axially compressing said O-rings and increasing the radial force exerted thereby against said sleeve upon rotation of said nut with respect to said housing member.

5. A telescopic frictional shock absorber, as defined in claim 2, wherein said resilient means comprises a Belleville washer.

6. A telescopic frictional shock absorber, as defined in claim 5, wherein said Belleville washer is formed of a bimetallic material which varies the spring rate of said washer as a function of temperature.

7. A telescopic frictional shock absorber, as defined in claim 5, wherein the bore of said housing member is formed with a shoulder therein and said Belleville washer is centered by a shouldered washer located between said Belleville washer and the shoulder formed in said bore.

8. A telescopic frictional shock absorber, as defined in claim 4, which includes a packing ring located between said O-rings and said nut.

9. A telescopic frictional shock absorber, as defined in claim 5, wherein said sleeve is formed of a friction material which exhibits high static to dynamic friction ratio characteristics.

References Cited
UNITED STATES PATENTS

| | | | |
|---|---|---|---|
| 1,713,515 | 5/1929 | Bechereau | 188—129 |
| 2,940,552 | 6/1960 | Freyler | 188—129 |

DUANE A. REGER, *Primary Examiner.*